United States Patent

Boden et al.

[11] 3,901,408
[45] Aug. 26, 1975

[54] MACHINE INCLUDING MEANS FOR INDEPENDENTLY ADJUSTING THE DOSE OF TWO REACTIVE, FLOWABLE COMPONENTS INTO A MIXING CHAMBER

[75] Inventors: Heinrich Boden, Opladen; Ulrich Knipp, Schildgen, both of Germany

[73] Assignee: Bayer Aktiengesellschaft, Leverkusen, Germany

[22] Filed: Sept. 9, 1974

[21] Appl. No.: 504,227

Related U.S. Application Data

[63] Continuation of Ser. No. 366,319, June 4, 1973, abandoned.

[30] Foreign Application Priority Data

June 7, 1972 Germany............................ 2227559

[52] U.S. Cl. ................. 222/134; 222/309; 222/386

[51] Int. Cl.² ........................................... B67D 5/60
[58] Field of Search ........... 222/334, 309, 386, 135, 222/137, 134

[56] References Cited
UNITED STATES PATENTS

| 3,174,649 | 3/1965 | Richardson | 222/135 |
| 3,640,433 | 2/1972 | Rodth | 222/137 |

Primary Examiner—Richard A. Schacher
Assistant Examiner—James M. Slattery
Attorney, Agent, or Firm—Lawrence S. Pope

[57] ABSTRACT

A machine comprising a first piston-cylinder arrangement which is connected to a second piston-cylinder arrangement. The second arrangement being provided with a differential piston, is used for dosing flowable components into a mixing chamber.

8 Claims, 6 Drawing Figures

MACHINE INCLUDING MEANS FOR INDEPENDENTLY ADJUSTING THE DOSE OF TWO REACTIVE, FLOWABLE COMPONENTS INTO A MIXING CHAMBER

This is a continuation of application Ser. No. 366,319, filed June 4, 1973; and now abandoned.

This invention relates to a machine for dosing two reactive, flowable components through pipes into a mixing chamber, consisting of two dosing cylinders with inlets and outlets and associated dosing pistons.

Machines of this kind are used for the preparation of mixtures from which plastics mouldings can be directly produced. Depending upon the type of starting components and suitable additives, it is possible to produce mouldings existing of homogeneous materials, foams or integral foams optionally containing fillers such as inorganic or organic fibres, clay and mica. The first principal component of the starting materials used for the production of homogeneous or cellular polyurethanes are, for example, polyhydroxyl compounds with at least two hydroxyl groups and molecular weights of from 62 to 10,000, preferably from 62 to 5000, for example polyesters, poly-ethers, polythio-ethers, polyacetals, polycarbonates and poly-ester amides containing at least two, generally two to eight, but preferably two hydroxyl groups. The second principal component consists predominantly of aliphatic, cycloaliphatic, aralkyl and aromatic polyisocyanates, more particularly polyisocyanates which can readily be obtained on a commercial scale, for example 2,4- and 2,6-tolylene diisocyanate and any mixtures of these isomers, and polyphenyl-polymethane polyisocyanates. In addition, so-called two-component resins, such as polyester resins and epoxide resins can be processed in machines of this kind.

The machines generally used comprise dosing pumps, and inject the components into a mixing chamber, preferably under relatively high pressures, before they enter a moulding tool. In this case, dosing is carried out as a function of time, in other words the pumps continue filling the mixing chamber until the requisite quantities of components have been mixed and introduced into the mould cavity. Since the pumps comprise several pistons, high stroke frequencies are necessary in order to avoid pulsating delivery. Materials of relatively high viscosity do not readily lend themselves to pump-delivery. The ratio of the total batch to a possible faulty batch is particularly unfavourable in the manufacture of small mouldings. For reasons of wear, machines of this kind can only be used for the simultaneous dosage of fillers in cases where very fine-grained fillers are used.

Dosing machines with two or more displacement piston pumps are also known. The pumps are driven through a common rotatable yoke and can be adjusted to one another in the dosing ratio. In machines of this kind, filler-containing raw materials of relatively high viscosity can be dosed over part of the piston stroke for filling moulding tools, although hitherto this has only been possible at low pressures in conjunction with mixing chambers equipped with stirring mechanism.

The object of the present invention is to provide a machine which guarantees accurate, volumetric dosage coupled with pulsation-free delivery to the mixing chamber. The machine according to the invention is also intended to enable components of relatively high viscosity, optionally even together with fillers present in them, to be dosed both under low and also under elevated pressures.

To achieve this object, the invention provides a machine comprising a dosing arrangement for each arrangement including a dosing piston with an associated dosing cylinder provided with inlets and outlets;

a housing with guides for a hydraulic piston-cylinder arrangement, which at its one end, carries a first dosing piston, which corresponds with the first dosing cylinder; a drive mechanism for the hydraulic piston-cylinder-arrangement;

a second dosing piston which corresponds with the second dosing cylinder, one of these elements is rigidly connected to said hydraulic piston-cylinder-arrangement whereas the other is connected to said housing; at least one differential dosing piston corresponding with said second dosing arrangement and projecting into the dosing chamber of said second dosing cylinder said differential dosing piston being adjustable in its depth of projection. This arrangement provides for accurate volumetric dosing. The differential dosing piston allots an accurate, volumetric dosage of different quantities of one component in relation to the quantity of the other component, even in succession one after the other during delivery of the components into the mixing chamber. Providing the time interval for changing the ratio is suitably selected, it is even possible to provide the moulding to be produced with special properties. In the manufacture of seat cushions, for example, it is possible to obtain differences in specific gravity over their thickness and, hence, differences in compressibility by displacing the property level.

The pistons are in the form of displacement pistons and have considerable clearance from the cylinder wall so that on the one hand, in the case of filler-containing components, no wear of the walls can occur through abrasion whilst, on the other hand, the fillers are not crushed, in addition to which it is possible to dose materials of relatively high viscosity. All these advantages are particularly in evidence, the higher the working pressures or the larger the piston surfaces, and in the case of an extremely high ratio of piston diameter to piston length.

A first preferred embodiment of the machine comprises a housing with guides for a piston rod which, at its one end, carries a first dosing piston which corresponds with the first dosing cylinder having an inlet and outlet arranged on the housing;

a drive mechanism for the piston rod;

a second dosing cylinder with an inlet and outlet which is rigidly connected to the other end of the piston rod through an intermediate member and which corresponds with the second dosing piston mounted rigidly and coaxially with the second dosing cylinder in the housing;

at least one differential dosing piston which, at one end, is displaceably mounted in the end face of the second dosing cylinder and which, at its end projecting into the second dosing cylinder, comprises a stop whilst its other end is guided in an extension of the housing, and an adjustable stroke-limiting element for the differential dosing piston arranged in the extension of the housing.

A second preferred embodiment of the machine comprises a dosing piston for each component with associated dosing cylinders provided with inlets and outlets; a housing surrounding a hydraulic piston-cylinder-arrangement, the hydraulic cylinder being movable guided in said housing, said hydraulic piston being mounted rigidly and coaxially with said housing;

a drive mechanism for the hydraulic piston-cylinder-arrangement, the hydraulic cylinder carrying at its one end a first dosing piston which corresponds with a first dosing cylinder having an inlet and outlet arranged at the housing;

a second dosing cylinder having an inlet and outlet which is rigidly connected to the housing;

a second dosing piston mounted rigidly and coaxially with said second dosing cylinder and which is rigidly connected to the other end of the hydraulic cylinder through an intermediate member;

at least one adjustable differential dosing piston projecting into a bore of said second dosing piston, said bore being part of the dosing chamber of the second dosing cylinder The coaxial arrangement of the two dosing pistons is of particular advantage because, in this embodiment, no tilting moments occur at the often high delivery pressures. Accordingly, the seals are subjected to less stressing, in addition to which the piston and cylinder walls are protected.

According to a further development of the machine according to the invention, a switching mechanism for dosing and return is preferably provided together with corresponding return pipes. In this embodiment, the dosing machine functions permanently at maximum stroke. By means of the switching mechanism adjusted to the requisite dosing quantity, the machine is switched from the return position to the dosing position shortly after the beginning of the delivery stroke and back to return on completion of the dosing operation, so that the residual delivery volume is forced back into the storage vessels. The switching mechanism consists of stroke-limiting elements which are coupled with the opening and closing members in the feedpipes of the mixer. This provides for synchronous opening and closing of these members at the beginning and end of the dosing stroke. The after-flow of a component which causes undesirable faults in the finished mouldings is avoided by this positive control.

An adjusting drive is preferably associated with the stroke-limiting element of the differential dosing piston. Alternatively, it is provided, optionally in addition, with a scale and can be adjusted by hand.

In an alternative embodiment, adjustable stroke-limiting elements are associated with the drive mechanism. They consist for example of a crank, cam or the like and of a switching contact, and reverse the direction of rotation of the drive motor or of a reversing valve. In this embodiment, the width of the stroke can be adapted exactly to the delivery volume.

In a further development of this particular embodiment, the adjusting drive is designed to be actuated by the piston rod through adjustable switching contacts. Through the stroke movement of the piston rod, a relative movement is made between the switching contacts so that, given a suitable setting, the dosing ratio can be changed after a required quantity has already been dosed in another ratio. The change can be effected by sudden reversal. In cases where a variable-speed adjusting drive is used, the dosing ratio can even be continuously changed.

Alternatively, the adjusting drive can be actuated by the drive mechanism through a time relay. The time relay can be adjusted to any required, retarding time interval. Retarded by this time interval, the adjusting drive for the stop of the differential dosing piston is actuated following actuation of the drive mechanism. It is possible to obtain the same effects as in the previously described embodiment.

Two exemplary embodiment of the machine according to the invention are illustrated purely diagrammatically in the accompanying drawings and described in detail in the following. The actual machine according to the invention are shown in cross section, whilst the associated units of the installation as a whole are illustrated in the form of circuit diagrams. In the accompanying drawings:

FIG. 5 shows the machine illustrated in FIGS. 1 and 2, but with stroke-limiting elements associated with the drive mechanism.

Figure 1:
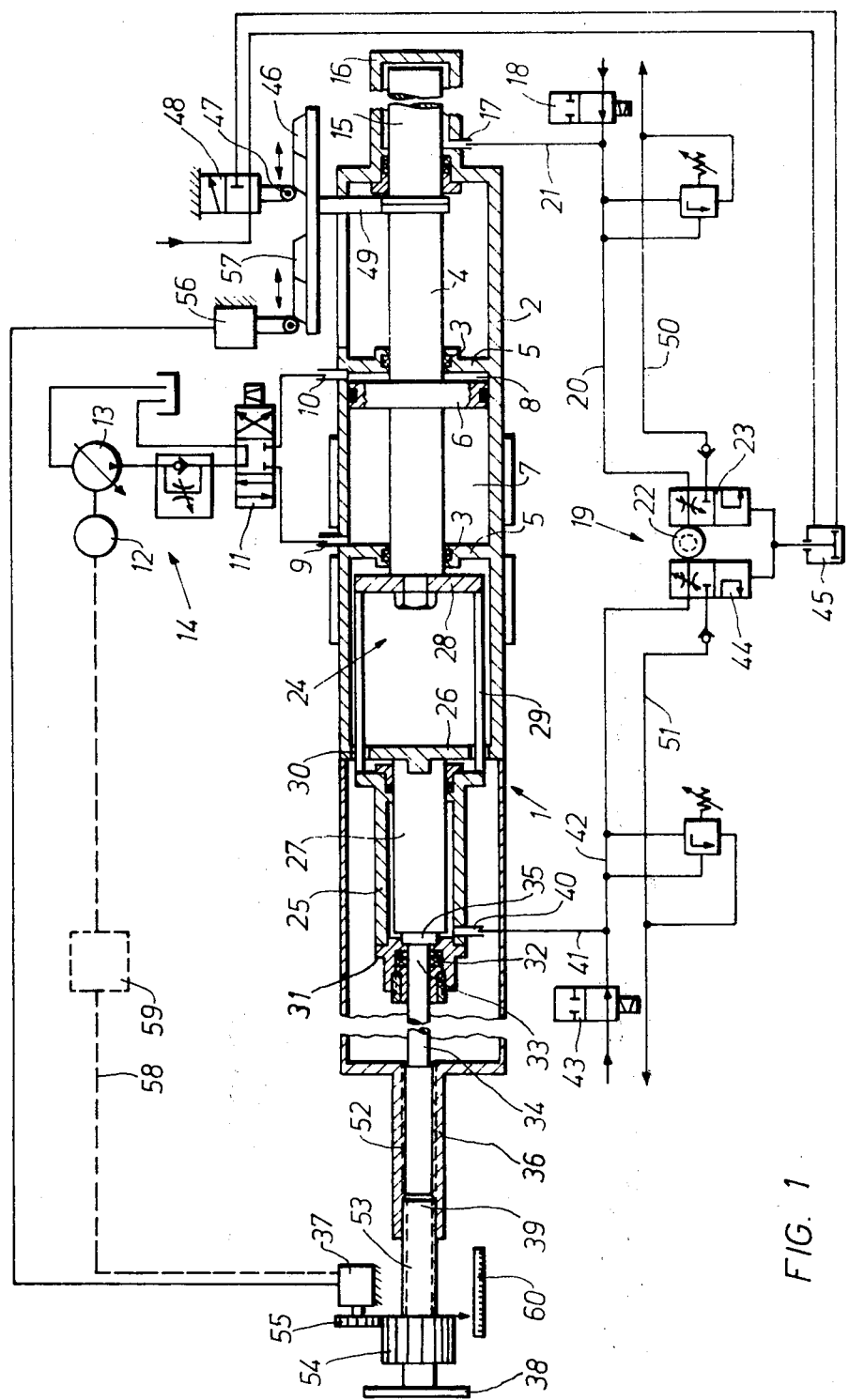
FIG. 1 is a general view of the first embodiment of the machine with the switching mechanism and return pipes with empty dosing cylinders.
Figure 2:
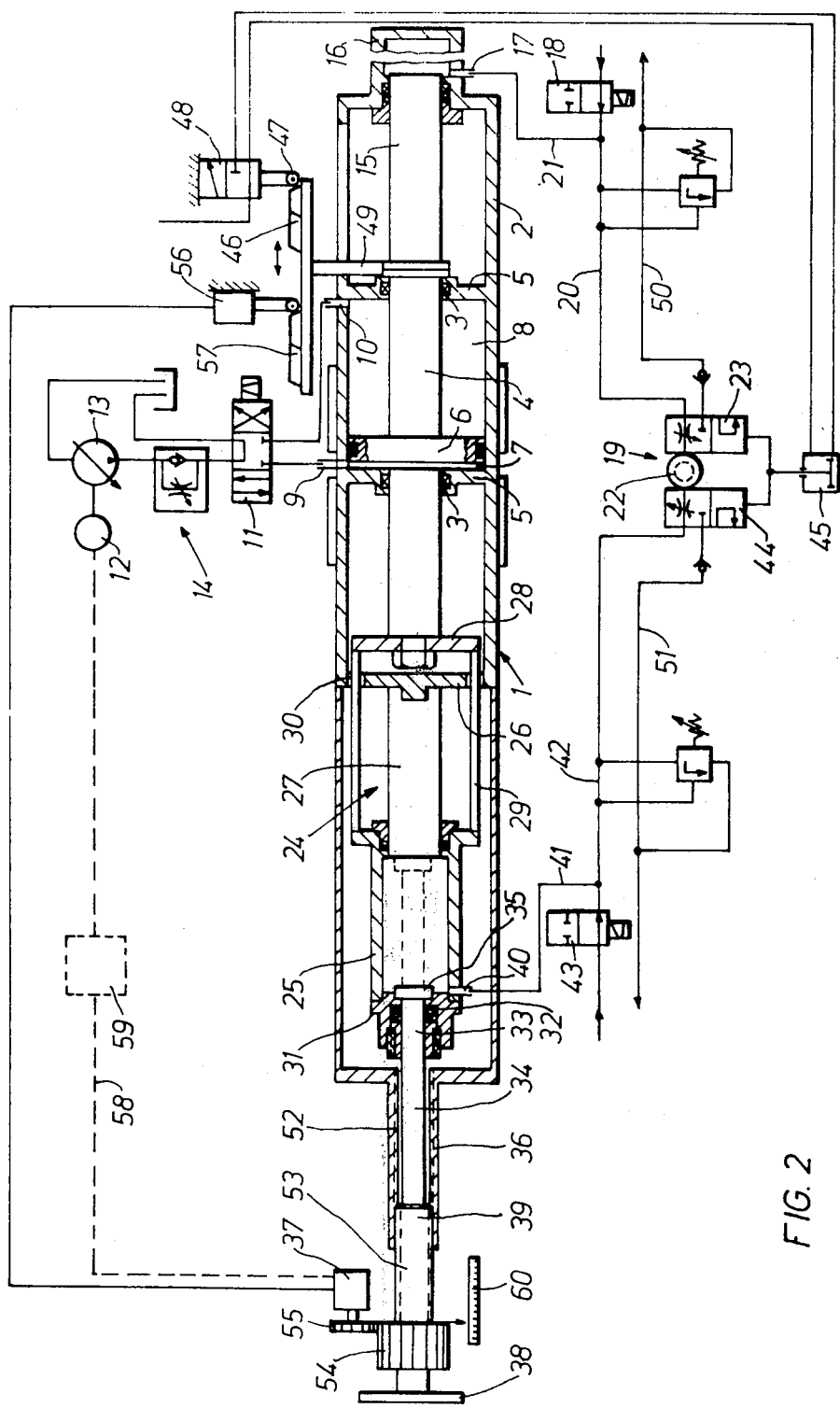
FIG. 2 is a general view of the machine shown in FIG. 1 with filled dosing cylinders.

In FIGS. 1 to 4, the dosing machine 1 consists of a housing 2 with guides 3 for a piston rod 4. The guides 3 are arranged in radial housing walls 5 which between them define a hydraulic chamber which is divided into two pressure chambers 7 and 8 by a double-acting piston 6 arranged on the piston rod 4. An inlet 9 and an outlet 10 are associated with each of the pressure chambers 7 and 8. They are connected to a reversing valve 11. The reversing valve 11 together with a drive motor 12 and a hydraulic pump 13 forms a hydraulic drive mechanism 14. A dosing piston 15 is arranged on the right-hand end of the piston rod 4. It is designed to be reciprocated in a dosing cylinder 16 arranged on the housing 2 by means of the piston rod 4. The dosing cylinder 16 is provided with an inlet and outlet 17. A shut-off slide 18 is arranged in a delivery pipe 20 which leads from a storage vessel (not shown) to a mixer 19. A branch pipe 21 connects the delivery pipe 20 to the inlet and outlet 17. The mixer 19 contains a mixing chamber 22 into which the delivery pipe 20 opens. A shut-off slide 23 is arranged immediately in front of the opening.

An intermediate member 24, in the form of a so-called "lantern", guided in the housing 2 is arranged on the left-hand end of the piston rod 4. It terminates in a second dosing cylinder 25 which is designed to reciprocate on a second dosing piston 27 rigidly fixed to a radial wall 26 of the housing 2. The intermediate member 24 consists of an end plate 28 fixed to the piston rod 4 and of rods 29 which connect it to the dosing cylinder 25. These rods 29 are guided in holes 30 in the radial wall 26. The end face 31 of the dosing cylinder 25 has a bore 33 which is provided with a packing 32 and in which a differential dosing piston 34 is guided. That end of the differential dosing piston 34 which projects into the dosing cylinder 25 is provided with a stop 35 so that, on the emptying stroke, the machine takes the differential dosing piston 34 with it. The other end of the differential dosing piston 34 is guided in an extension 36 of the housing 2. A stroke-limiting element 39 designed to be adjusted through an adjusting drive 37 or manually by means of a hand wheel 38, is arranged in this extension 36 of the housing 2.

The dosing cylinder 25 is provided with an inlet and outlet 40 from which a branch pipe 41 opens into a delivery pipe 42 coming from a second supply vessel (not shown). A shut-off slide 43 is provided in the delivery pipe 42 in front of the opening of the branch pipe 41. The delivery pipe 42 leads into the mixer 19. A shut-off slide 44 is arranged immediately in front of the opening into the mixing chamber 22. The shut-off slides 23 and 44 are designed to be synchronously actuated by means of a common hydraulic adjustment 45. They are actuated through adjustable stroke-limiting elements consisting of a crank 46 and of a switching contact 47 which responds to this crank and which acts directly on a slide 48 of the hydraulic adjustment 45. The crank 46 is adjustable in its length corresponding to the required stroke length and, accordingly, consists of two parts arranged adjacent one another which are adjustable in length relative to one another. They are fixed to the piston rod 4 through a holder 49.

The components 23, 44, 45, 46, 47, 48 of the machine essentially form a switching mechanism for dosing and return. The return pipes are denoted by the references 50 and 51.

The stroke-limiting element 39 of the differential dosing piston 34 consists of a screw spindle 53 guided in a thread 52 in the extension 36. In addition to the handwheel 38, it comprises a wide gear wheel 54 which meshes with a pinion 55 of the adjusting drive 37 in any position of the screw spindle 53. The adjusting drive 37 is connected to a switching contact 56 which responds to a two-part crank 57 which is also arranged on the holder 49.

Alternatively, the adjusting drive 37 is connected to the drive motor 12 of the drive mechanism 14 through a time-delay relay 59 in accordance with the chain-line connection 58. The reference 60 denotes an adjusting scale.

The machine illustrated in FIGS. 1 to 4 operates as follows:

The dosing pistons 15, 27 and 34 initially occupy the position shown in FIG. 1. The hydraulic adjustment 45 keeps the shut-off slides 23 and 44 closed, whilst the shut-off slides 18 and 43 are opened. The components flow from the storage vessels through the pipes 20, 21 and 42, 41 into the dosing cylinders 16 and 25 as long as the dosing piston 15 and the dosing cylinder 25 make an induction stroke. The crank 46 is adjusted to the required dosing stroke. At the end of the induction stroke, the dosing pistons 15, 27 and 34 are in the position shown in FIG. 2. The reversing valve 11 is then switched so that the pressure chamber 7 is charged. The piston 6, together with the piston rod 4 and the components connected to it, is then pushed to the right into the position shown in FIG. 1, the components being displaced from the dosing cylinders 16 and 25 and, with the shut-off slides 18 and 43 closed, flow back through the pipes 21, 20 and 41, 42 to the mixer 19 and through the slides 23 and 44 in their shut-off position and through the return pipes 50 and 51 into the storage vessels (not shown). The slide 48 is then opened by means of the crank 46 and the switching contact 47 so that the hydraulic adjustment 47 can open the shut-off slides 23 and 44. Dosing continues as long as the switching contact 47 is actuated by the crank 46. The hydraulic adjustment 45 then switches the shut-off slides 23 and 44 to return and the excess delivery volume of the components flows through the return pipes 50 and 51 back into the storage vessels for the components.

Figure 4:
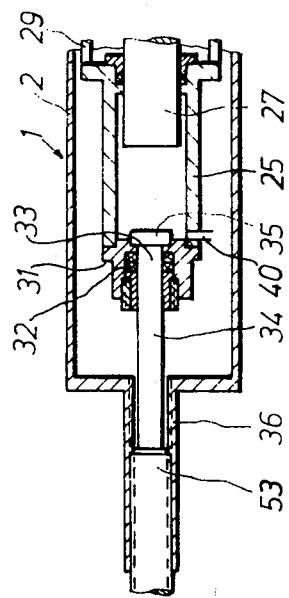
FIG. 4 shows part of the machine with the same stroke adjustment of the differential dosing piston as in FIG. 3, but partly in the empty condition, i.e., in the ejection position of the dosing cylinder.
Figure 3:
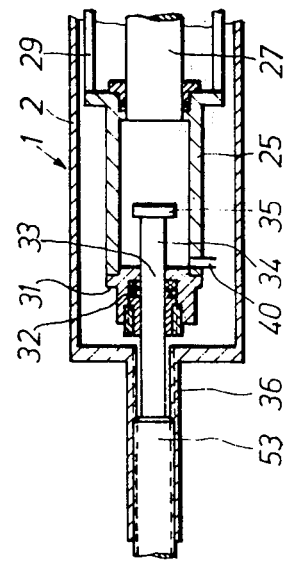
FIG. 3 shows part of the machine illustrated in FIGS. 1 and 2 with a different stroke adjustment of the differential dosing piston in the filled condition of the dosing cylinders.
Figure 2:
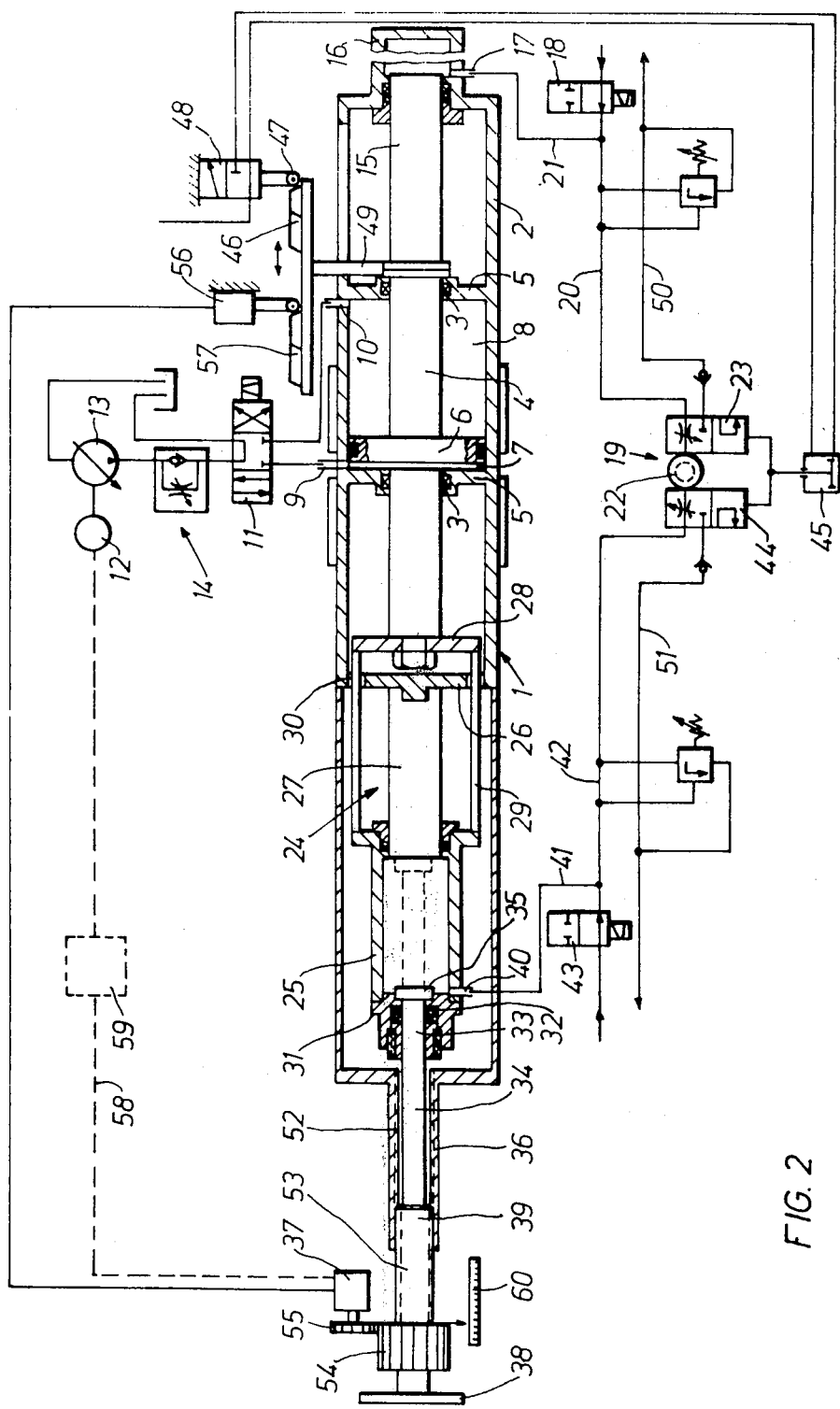

The stroke-limiting element 39 of the differential dosing piston 34 has been adjusted to minimum stroke (= zero stroke), i.e. to the maximum delivery volume for the dosing cylinder 25, by means of the handwheel 38. Accordingly, the stroke-limiting element 39 can be adjusted by hand into another position, for example as shown in FIGS. 3 and 4.

If, by contrast, the dosing ratio of the components is to be changed during the dosing operation, the crank 57 is adjusted in such a way that, for a predetermined stroke width, the switching contact 56 actuates the adjusting drive 37 which then adjusts the stroke-limiting element 39 in such a way that the output per unit of time from the dosing cylinder 25 changes. As a result, the dosing ratio of the components also changes. The adjusting drive 37 is preferably variable in its speed, thus enabling a sudden change, but also a continuous change, in the dosing ratio to be adjusted. In addition, the continuous variation of the dosing ratio can be interrupted at a predetermined time by correspondingly adjusting the component parts of the crank 56, so that, from this moment onwards, a new, constant dosing ratio is applied to the components.

The reference numerals used in the following description of the embodiment of the machine shown in FIG. 5 are the same as those used in the description of FIGS. 1 to 4 where the components in question are identical or comparable:

A holder 49 is arranged on the piston rod 4, carrying a crank 61 which consists of two parts displaceable towards one another and which cooperates with a switching contact 62. The switching contact 62 actuates a shut-off slide 63 which actuates the reversing valve 11 through an adjusting member 64 and, at the same time, three-way valves 66 and 67 through an adjusting member 65. These valves are arranged at the openings of the branch pipes 21 and 41 into the delivery pipes 20 and 42. In this embodiment, the entire quantity taken in under suction is also completely dosed into the mixer 19.

The mode of operation is as follows:

When the drive motor 12 is switched on, the pressure chamber 8 is charged so that the dosing piston 15 is moved out of the position shown in FIG. 5 and makes an induction stroke. The left-hand part of the crank 61 is fixedly adjusted, whilst the right-hand part is adjusted to the required stroke width which corresponds to the required dosing volume. The induction stroke is interrupted when the switching contact 62 is no longer actuated by the crank 61. At this moment, the reversing valve 11 is switched and the pressure chamber 7 charged, thus initiating the delivery stroke. The delivery stroke is interrupted when the crank 46 no longer actuates the switching contact 62. The next induction stroke is then initiated either automatically or by hand. Switching of the reversing valve 11 is accompanied by switching of the three-way valves 66 and 67 through the adjusting member 65. During the induction stroke, the three-way valve 66 connects the delivery pipe 20 coming from the storage vessel to the dosing cylinder 16, whilst the three-way valve 67 connects the delivery pipe 42 to the dosing cylinder 25 through the branch pipe 41. Accordingly, the mixer 19 is not charged. During the dosing stroke, i.e., on completion of the induction stroke, the adjusting member 65 is actuated by switching the slide 63 and the three-way valves 66 and 67 establish the connection between the branch pipes 21 and 41 and the mixer 19. On completion of the dosing stroke, the three-way valves 66 and 67 are switched into the previous position.

The stroke of the differential dosing cylinder 34 is adjusted in exactly the same way as in the embodiment of the machine shown in FIGS. 1 to 4.

Figure 6:
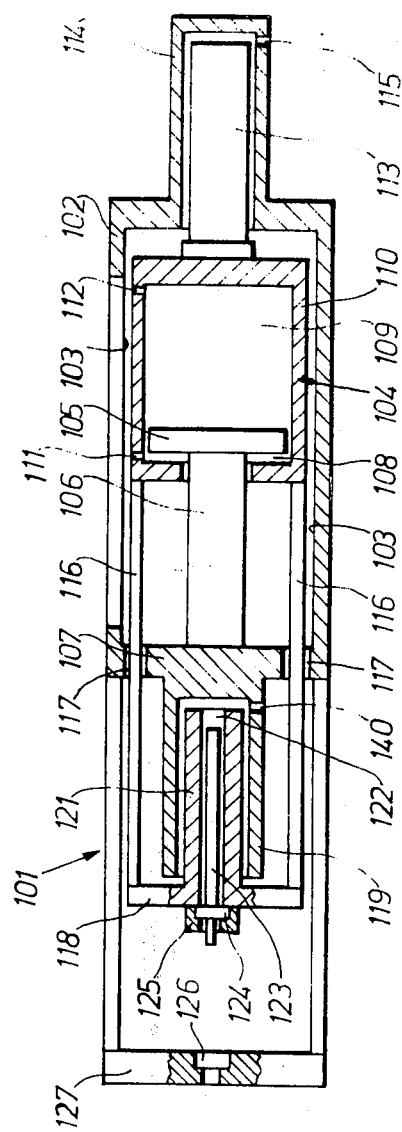
FIG. 6 is a general view of the second embodiment of the machine with emptied dosing cylinders but without the switching mechanism which may be more or less identical with that of the first embodiment of the machine.

In FIG. 6, the dosing machine 101 exists of a housing 102 with guides 103 for a piston-cylinder-arrangement 104. The piston 105 is fixed with its rod 106 at a radial housing wall 107. The pressure chambers 108 and 109 of the cylinder 110 are supplied with openings 111 and 112, acting as well as inlets and outlets. At the right facing side of the cylinder 110 a dosing piston 113 is coaxially mounted and acting within a dosing cylinder 114, which is an elongation of the housing 102 and provided with an inlet and outlet 115. The other facing side of the cylinder 110, which is interrupted by the piston rod 106, carries rods 116 guided in holes 117 of the radial housing wall 107 which are mounted with their other ends in a plate 118. The radial housing wall 107 is also combined with a dosing cylinder 119 provided with an inlet and outlet 120 and with a second dosing piston 121. The piston 121 shows a central bore 122 in which a differential dosing piston 123 is guided. In comparison with the first embodiment, this is a simplified embodiment of the differential dosing piston. The differential dosing piston 123 is supplied with a collar 124, which is surrounded by a lock nut 125 to hold the piston 122 in its position. It is also possible to remove the lock nut 125 and to fix the collar 124 in the bore 126 of an end plate 127. Alternation of the dosing proportion during the stroke is not possible with this embodiment. But it is also possible to supply this embodiment with a differential dosing piston arrangement equal or similar to that shown in the first embodiment.

What we claim is:

1. A machine for dosing two components through conduits into a mixing chamber, comprising a dosing arrangement for each component, each arrangement including a dosing piston with an associated dosing cylinder provided with inlets and outlets;

a housing with guides for a hydraulic piston-cylinder-arrangement, which at its one end, carries a first dosing piston, which corresponds with the first dosing cylinder; a drive mechanism for the hydraulic piston-cylinder-arrangement;

a second dosing piston which corresponds with the second dosing cylinder, either said dosing piston or said dosing cylinder is rigidly connected to said hydraulic piston-cylinder-arrangement whereas the other is connected to said housing; at least one differential dosing piston corresponding with said second dosing arrangement and projecting into the dosing chamber of said second dosing cylinder, said differential dosing piston being independently adjustable in its depth of projection to independently adjust the volume of said second dosing cylinder without changing the volume of said first dosing cylinder.

2. A machine according to claim 1, comprising a dosing piston for each component with associated dosing cylinders provided with inlets and outlets; a housing with guides for a piston rod which, at its one end, carries a first dosing piston which corresponds with the first dosing cylinder having an inlet and outlet arranged at the housing; a drive mechanism for the piston rod; a second dosing cylinder with an inlet and outlet which is rigidly connected to the other end of the piston rod through an intermediate member and which corresponds with the second dosing piston mounted rigidly and coaxially with the second dosing cylinder in the housing; at least one differential dosing piston which, at one end, is displaceably mounted in the end face of the second dosing cylinder and which, at its end projecting into the second dosing cylinder, comprises a stop whilst its other end is guided in an extension of the housing; and an adjustable stroke-limiting element for the differential dosing piston arranged in the extension of the housing.

3. A machine according to claim 1, comprising a dosing piston for each component with associated dosing cylinders provided with inlets and outlets; a housing surrounding a hydraulic piston-cylinder-arrangement, the hydraulic cylinder being movable guided in said housing, said hydraulic piston being mounted rigidly and coaxially with said housing;

a drive mechanism for the hydraulic piston-cylinder-arrangement the hydraulic cylinder carrying at its one end a first dosing piston which corresponds with a first dosing cylinder having an inlet and outlet arranged on the housing;

a second dosing cylinder having an inlet and outlet which is rigidly connected to the housing;

a second dosing piston mounted rigidly and coaxilly with said second dosing cylinder and which is rigidly connected to the other end of the hydraulic cylinder through an intermediate member;

at least one adjustable differential dosing piston projecting into a bore of said second dosing piston, said bore being part of the dosing chamber of the second dosing cylinder.

4. A machine as claimed in claim 1, comprising a switching mechanism allowing dosing into the mixing chamber or to the storage vessels corresponding return conduits being provided.

5. A machine as claimed in claim 1, wherein adjustable stroke-limiting elements are associated with the drive mechanism.

6. A machine as claimed in claim 2, wherein an adjusting drive is associated with the stroke-limiting element of the differential dosing piston.

7. A machine as claimed in claim 6, wherein the adjusting drive is actuated by the piston rod through adjustable switching contacts.

8. A machine as claimed in claim 6, wherein the adjusting drive is actuated by the drive mechanism through a time-delay relay.

* * * * *